Dec. 29, 1970 J. T. KRAUSE 3,551,129

STABILIZATION OF GLASSES FOR ULTRASONIC DELAY LINES

Filed Dec. 27, 1967

INVENTOR
J. T. KRAUSE
BY
ATTORNEY

United States Patent Office
3,551,129
Patented Dec. 29, 1970

3,551,129

STABILIZATION OF GLASSES FOR ULTRASONIC DELAY LINES

John T. Krause, New Providence, N.J., assignor to Bell Telephone Laboratories, Incorporated, Murray Hill and Berkeley Heights, N.J., a corporation of New York Filed Dec. 27, 1967, Ser. No. 693,969
Int. Cl. C03b *25/02*
U.S. Cl. 65—117 9 Claims

ABSTRACT OF THE DISCLOSURE

The specification describes a heat treatment for establishing a condition of "un-aged" or miximum ultrasonic delay time of alkali-lead-silicate glasses. These glasses exhibit a "temporal instability" in delay time, known generally as "aging"; which is manifested by a decrease in delay time with time. One important aspect of aging is that it is a heat-sensitive reversible process. Zero temperature coefficient glasses which have aged, have been found to exhibit significant increases in delay time (reverse of "normal aging") as a consequence of exposure to modest temperature changes of the nature encountered in the ordinary use environment. The process which initiates the delay time increase is distinct from the normal aging effect which produces moderate decreases in delay time over extended periods. This delay time hysteresis is reduced, according to the invention, by pre-exposing the glass to a modest temperature cycle. This cycle advantageously includes a soak period at the peak temperature. The glass is then in a condition of un-aged or maximum delay time.

Figure 1:
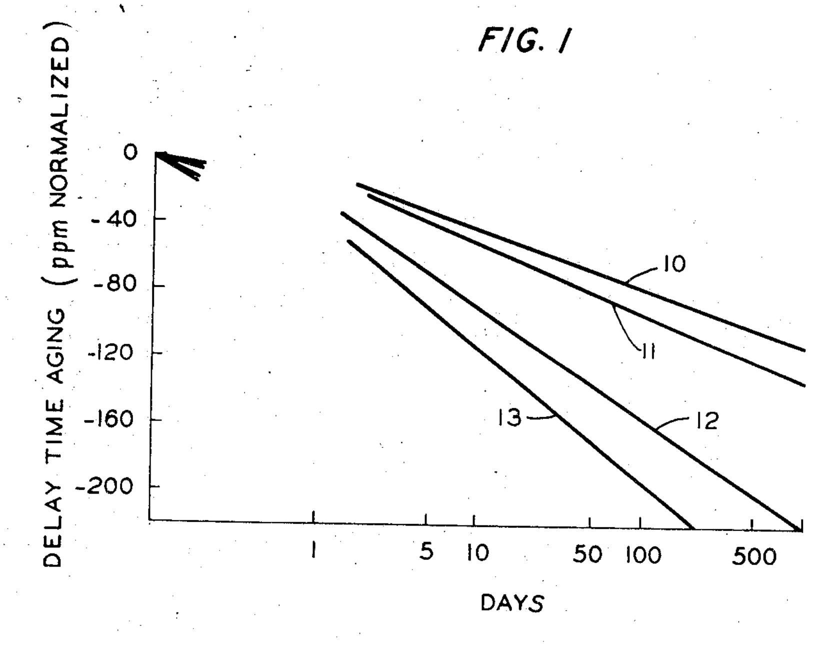

This invention relates to temperature-stable delay lines made from specially-processed alkali-lead-silicate glasses. Specifically, it is directed to a processing technique for reducing instabilities in the unit delay time of these glasses caused by mild thermal excursions encountered during normal use.

Most of the significant applications being considered for ultrasonic delay lines require a unit delay time which is stable with time over the normally encountered temperature range. Variations in unit delay time of the order of less than 200 p.p.m. over a temperature range of 0° C. to 100° C. is a typical requirement. This prescription can be met by delay lines constructed of certain materials which show a high degree of temperature insensitivity. Among these are the alkali-lead-silicate glasses described in United States Pat. No. 3,154,425 issued to H. L. Hoover and M. E. Nordberg on Oct. 27, 1964. These glasses are relatively inexpensive and easy to prepare. They have zero temperature coefficients falling within the temperature range of normal use. If the composition is chosen so that the inversion or turnover point falls near the normal operating temperature of the device for which the material is destined, the variation of delay time with temperature is minimized. The glass compositions which exhibit these characteristics are composed of heavy metal oxides in an amount equivalent to 20 to 50 percent PbO, alkali metal oxides in an amount equivalent to 4 to 20 percent $K_2O$, and the balance essentially $SiO_2$. At least one-half of the heavy metal oxide content should be PbO while the remainder may be selected from other oxides of lead, and oxides of cadmium, barium and bismuth, the CdO and BaO contents not exceeding 10 percent and the content of $Bi_2O_3$ not exceeding 25 percent. At least one-half of the alkali metal oxide content should be $K_2O$, and preferably all. All of the foregoing percentages are in terms of percent by weight.

In addition to the problem of temperature stability, these glasses have been found to exhibit changes in unit delay time on aging. This problem is treated in United States Pat. No. 3,173,780 issued to H. L. Hoover on Mar. 16, 1965, which describes a thermal treatment to eliminate the propensity of the glass toward temporal instabilities or "normal aging." The treatment consists basically of a moderately fine anneal of the glass through its transformation range to approximately 200° C. It is found that a glass subject to a fine anneal shows less temporal instability than one given a coarse anneal. That is the glass exhibits a markedly slower change in delay time on normal aging at room temperature.

Investigations have revealed that the aging effects of these alkali-lead-silicate glasses are complex and that the direction of aging is a heat-sensitive reversible process. It has now been found that modest thermal excursions encountered in the normal use environment cause a reverse aging effect. The effect is a relatively rapid increase in delay time to a level proportionate to the maximum temperature encountered. This suggests a different aging mechanism than that of normal aging since that produces a relatively slow decrease in delay time with time. This reverse aging effect can be initiated by a single thermal cycle and is perhaps more properly considered as a temperature sensitivity or thermal instability rather than an aging effect. The condition of un-aged or maximum delay time can be attained, according to the invention, by heating the glass to a temperature between 80° C. and 150° C. Cycling the glass to this temperature over a period of one hour gives a degree of improvement but a holding or soak period at the peak of the cycle, or slow-cooling from the peak temperature, will give the maximum benefits. A soak period of at least one hour will provide a useful result. There is no real maximum but soaking beyond 24 hours is not likely to produce further improvement.

Figure 2:
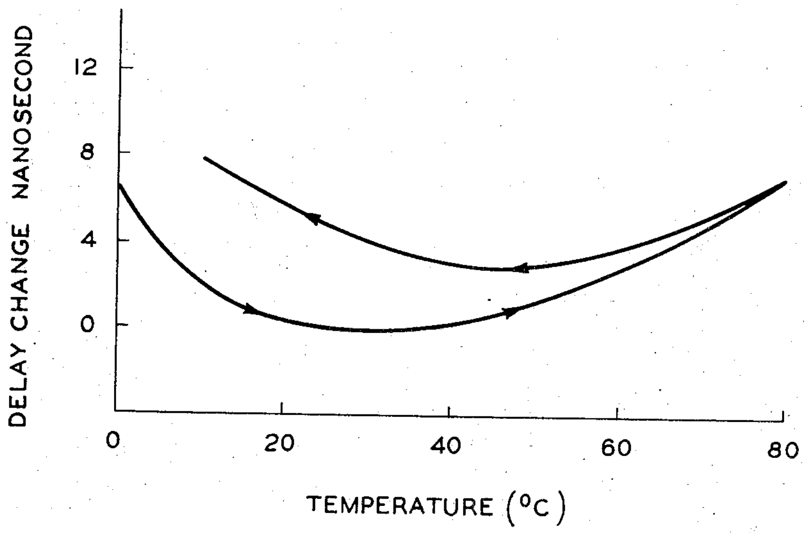

These and other aspects of the invention may be more easily understood from a consideration of the following detailed description. In the drawing:

FIG. 1 is a plot of normal room temperature aging in days (log scale) versus delay time variation in p.p.m. divation for an alkali-lead-silicate "zero TC" (temperature coefficient) glass showing the effects of fine versus coarse anneals; and FIG. 2 is a plot of delay time variation (in nanoseconds) versus temperature for fine annealed glasses showing the delay time instability occasioned by modest temperature excursions.

The plot of FIG. 1 shows four aging rate curves for an alkali-lead-silicate glass. The glass was a zero TC composition containing 39.5 percent PbO, 9.5 percent $K_2O$, 1 percent BaO and the balance, $SiO_2$. Curve 10 shows the aging, in terms of change in delay time in p.p.m. versus time in days, for a glass treated with a fine anneal of 0.54° F./hour. Curves 11, 12 and 13 show the aging behavior for the same glass exposed to schedules of 2.5° F./hour, 5° F./hour and 27° F./minute, respectively. In each case the rate given is the cooling rate through the transformation range. The data demonstrates the importance of the cooling rate on the aging characteristics of the glass. This behavior was recognized by the prior art in its efforts to improve the temporal stability of the glass.

A different instability characteristic of alkali-lead-silicate glass is illustrated in FIG. 2. Here there is plotted delay changes in nanoseconds versus temperature. The curves indicate a temperature cycle in the direction of the arrows. The temperature cycle is slow enough to achieve equilibrium. The lower part of the curve shows the delay time variations for a glass prepared in the normal way by slow cooling through the transformation range. When this glass is heated to 80° C. it will no longer retrace the lower curve when cycled back to room temperature. It is seen that its room temperature delay time after cooling (upper curve) has been changed by several nanoseconds as a consequence of this relatively shallow temperature cycle. Experience has shown that this behavior is typical for delay lines in actual service. The change in delay time induced by the temperature cycle is often large enough so that the device no longer operates according to specification and must be replaced. When this occurs to a finished device there is no known treatment for restoring the proper delay time and the device is generally rendered worthless.

Having recognized the nature of this temperature sensitivity, a treatment can be prescribed for minimizing its adverse effects. The treatment is to heat the glass to, or slightly above, the maximum temperature to which it will be exposed during service. This acts to stabilize the delay time on the upper portion of the curve of FIG. 2. Normal aging will commence following this heat treatment. It is ordinarily convenient to give the bulk glass this stabilizing treatment before the delay lines are fabricated. However since the temperature of treatment is quite low, a finished delay line can be successfully treated in accordance with the invention.

The heat treatment of this invention is useful for all glasses in the alkali-lead-silicate system described above. Another glass composition successfully treated in accordance with the invention had 45 percent PbO, 8 percent $K_2O$, balance $SiO_2$. The behavior of this glass was qualitatively the same as that of the other glasses tested.

These glasses would ordinarily be treated in accordance with this invention both to reduce the aging effects illustrtaed in FIG. 1 and to compensate for the instability described in connection with FIG. 2. The usual treatment prescribed would be to heat the glass to its annealing temperature (the temperature at which the glass has a viscosity of $10^{13}$ poises). The annealing point for the glasses within the scope of this invention is typically of the order of 460° C. and the strain point occurs at approximately 425° C. The cooling rate through the transformation range should be less than 2.5° F./hour.

The second phase of the treatment involves a subsequent heat treatment at a temperature in the range of 80° C. to 150° C. for at least one hour to stabilize the delay time for the temperature cycles to be encountered in service. A treatment at 125° C. for 18 hours is given by way of example. This auxiliary treatment can be done in combination with the anneal through the transformation range, or can be a separate step. There are some advantages in performing this moderate heat treatment as a step separate from the usual anneal. For instance, it can be given to a finished device. Also, it has been found that normal aging at room temperature of several years will produce a delay-temperature characteristic resembling that of an unstabilized glass, i.e., the lower portion of the curve of FIG. 2, even though the glass had been previously stabilized with the post anneal heat treatment of this invention. This suggests that if the glass is not destined for manufacture shortly after the heat treatment, the treatment should be repeated.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A post anneal treatment for conditioning an alkali-lead-silicate glass for un-aged or maximum ultrasonic delay time and for reducing the sensitivity of delay time hysteresis to moderate temperature changes experienced during the manufacturing process or in use, said glass having a thermal history which includes a fine anneal through the glass transformation range, the post anneal treatment comprising as a step separate from the said fine anneal, heating the glass to a temperature in the range of 80° C. to 150° C. and maintaining the glass at that temperature for a period of at least one hour.

2. The process of claim 1 wherein the alkali-lead-silicate glass has a composition defined as follows:

20 percent to 50 percent PbO
4 percent to 20 percent alkali metal oxides equivalent to $K_2O$
balance silica.

3. The process of claim 2 wherein a portion of the PbO is substituted by an oxide selected from the group consisting of the other oxides of lead, or oxides of cadmium, barium and bismuth.

4. The process of claim 2 wherein a portion of the $K_2O$ is substituted by oxides of Li, Na, Rb, Cs.

5. The process of claim 2 wherein the alkali-lead-silicate glass is composed approximately of 39.5 percent PbO, 9.5 percent $K_2O$, 1 percent BaO and the balance $SiO_2$, the percents given in weight percent.

6. The process of claim 2 wherein the alkali-lead-silicate glass is composed of approximately 45 percent PbO, 8 percent $K_2O$, balance $SiO_2$, the percents given in weight percent.

7. The process of claim 2 wherein the post anneal treatment is at 125° C. for 18 hours.

8. A process for stabilizing a delay line incorporating a zero temperature coefficient glass against variations in delay time caused by exposure of the delay line to moderate temperature changes encountered in use, said zero temperature coefficient glass having a previous thermal history that includes a fine anneal through the glass transformation range, the process comprising heating the delay line from room temperature to a temperature in the range of 80° C. to 150° C. for a period of at least one hour.

9. The process of claim 8 in which the period is of the order of 18 hours.

References Cited

UNITED STATES PATENTS 3,173,780 3/1965 Hoover ............ 65—117X

ARTHUR D. KELLOGG, Primary Examiner

U.S. Cl. X.R.

65—104